(12) United States Patent
Travas-Sejdic et al.

(10) Patent No.: US 6,727,019 B2
(45) Date of Patent: Apr. 27, 2004

(54) ELECTROCHEMICAL CELL HAVING AN IONOMER BINDER OF LI-AMPS AND ASSOCIATED FABRICATION

(75) Inventors: Jadranka Travas-Sejdic, Auckland (NZ); Shu-Yi Chu, Auckland (NZ); Yang Wang, Auckland (NZ); Rudolf Steiner, Auckland (NZ)

(73) Assignee: Ilion Technology, New York, NY (US)

( * ) Notice: Subject to any disclaimer, the term of this patent is extended or adjusted under 35 U.S.C. 154(b) by 115 days.

(21) Appl. No.: 09/815,384

(22) Filed: Mar. 22, 2001

(65) Prior Publication Data

US 2002/0136952 A1 Sep. 26, 2002

(51) Int. Cl.⁷ ................................................ H01M 4/62
(52) U.S. Cl. ...................................... 429/217; 429/232
(58) Field of Search ................................. 429/217, 232

(56) References Cited

U.S. PATENT DOCUMENTS

| | | | |
|---|---|---|---|
| 5,330,860 A | | 7/1994 | Grot et al. |
| 5,498,490 A | * | 3/1996 | Brodd .......................... 429/149 |
| 5,651,929 A | * | 7/1997 | Molter ......................... 264/104 |
| 5,707,763 A | | 1/1998 | Shimizu et al. |
| 5,739,234 A | | 4/1998 | Kashio et al. |
| 6,025,092 A | * | 2/2000 | Doyle ........................... 429/213 |
| 6,033,804 A | * | 3/2000 | Doyle ........................... 429/212 |
| 6,153,332 A | * | 11/2000 | Nishida ......................... 429/217 |

FOREIGN PATENT DOCUMENTS

| | | | | |
|---|---|---|---|---|
| JP | 355151769 A | * | 11/1980 | ............. H01M/4/62 |
| WO | WO 98/20573 | * | 5/1998 | ............. H01M/6/18 |
| WO | WO 98/22986 | | 5/1998 | |
| WO | WO 00/51806 | * | 9/2000 | ............. B29C/47/00 |

* cited by examiner

Primary Examiner—Mark Ruthkosky
(74) Attorney, Agent, or Firm—Factor & Lake, Ltd.

(57) ABSTRACT

An electrochemical cell comprising an electrolyte, a first electrode, and a second electrode, wherein at least one of the first and second electrodes comprises a current collecting substrate, and an electrode active material associated with at least a portion of the current collecting substrate, wherein the electrode active material is at least partially dispersed within an ionomer binder of Li-AMPS.

39 Claims, 10 Drawing Sheets

“ELECTROCHEMICAL CELL HAVING AN IONOMER BINDER OF LI-AMPS AND ASSOCIATED FABRICATION

BACKGROUND OF THE INVENTION

1. Field of the Invention

The present invention relates in general to electrochemical cells, and more particularly, to electrochemical cells that have an ionomer binder associated with the anodic and/or cathodic electrodes, to, in turn, enhance the electrochemical stability and performance of the electrochemical cell.

2. Background Art

Electrochemical cells have been known in the art for several years. Furthermore, lithium ion secondary electrochemical cells having electrodes with an active material incorporated into a polymeric binder are likewise well known. While electrodes using one or more conventional polymeric binders are known in the art, their solubility characteristics in common electrolyte solvents used in lithium/lithium ion based secondary electrochemical cells, as well as their poor adhesion to an associated current collector remain problematic. In particular, conventional polymeric binder materials, such as poly(vinylidenefluoride) (PVDF), polytetrafluoroethylene (PTFE), ethylenepropylenediene-methylene (EPDM), as well as conventional copolymeric binder materials, such as poly(vinylidenefluoride)/hexafluoropropene (PVDF/HFP), are sufficiently soluble in commonly used organic solvents that swelling of the binder material is readily observed— especially at elevated temperatures. Upon swelling of the binder material, conductivity between particles within the electrode active material can be substantially adversely affected. Moreover, swelling of the binder material can lead to loss of contact between the active material and an associated current collector, thereby further adversely affecting the electrochemical performance of the electrochemical cell, or in some cases rending the electrochemical cell non-operative.

Accordingly, it is desirable to provide an ionomer binder material suitable for use in association with an anodic and/or cathodic electrode for use in an electrochemical cell that is sufficiently insoluble in conventional organic electrolytes used in lithium/lithium ion based secondary electrochemical cells. It is further desirable to provide a binder material suitable for use in an anodic and/or cathodic electrode of a secondary electrochemical cell that exhibits enhanced adhesion to an associated current collector relative to conventional, non-ionomer binder materials.

These and other objects of the present invention will become apparent in light of the present specification, claims, and drawings.

SUMMARY OF THE INVENTION

The present invention is directed to an electrode for use in an electrochemical cell comprising: (a) a current collecting substrate; and (b) an electrode active material associated with at least a portion of the current collecting substrate, wherein the electrode active material is at least partially dispersed within an ionomer binder.

In a preferred embodiment of the present invention, the ionomer binder is substantially insoluble in polar aprotic organic solvents.

In another preferred embodiment of the present invention, the ionomer binder is substantially insoluble in a solvent selected from the group consisting of propylene carbonate, ethylene carbonate, diethyl carbonate, dimethyl carbonate, and mixtures thereof.

In yet another preferred embodiment of the present invention, the ionomer binder exhibits enhanced adhesion with an associated current collector relative to a non-ionomer binder.

Preferably, the ionomer binder comprises lithium 2-acrylamido-2-methyl-1-propane sulphonate (LiAMPS), a combination of LiAMPS and N,N-dimethylacrylamide (DMAA), and/or a combination of DMAA-co-LiAMPS copolymer and PVDF.

In accordance with the present invention, the electrode active material may be cathodic and comprise, for example, a transition metal oxide, a doped transition metal oxide, and/or a mixed transition metal oxide, optionally mixed with a carbonaceous material, such as carbon black graphite, etcetera. The electrode active material may also be anodic and comprise, for example, a carbonaceous material, such as graphite, MCMB mixed with carbon black, etcetera.

The present invention is further directed to an electrochemical cell comprising: (a) an electrolyte; and (b) a first electrode and a second electrode, wherein at least one of the first and second electrodes comprises: (1) a current collecting substrate; and (2) an electrode active material associated with at least a portion of the current collecting substrate, wherein the electrode active material is at least partially dispersed within an ionomer binder.

The present invention is also directed to an electrochemical cell consisting of: (a) an electrolyte comprising a salt, at least partially dissolved in a solvent preferably selected from the group consisting of propylene carbonate, ethylene carbonate, diethyl carbonate, dimethyl carbonate, and mixtures thereof; and (b) a first electrode and a second electrode wherein at least one of the first and second electrodes comprises: (1) a current collecting substrate; and (2) an electrode active material, wherein the electrode active material is associated with at least a portion of the current collecting substrate, and wherein the electrode active material is at least partially dispersed within an ionomer binder comprising LiAMPS.

A process for fabricating an electrochemical cell is additionally disclosed which comprises the steps of: (a) providing a first electrode having a current collecting substrate and an electrode active material associated with at least a portion of the current collecting substrate, wherein the electrode active material is at least partially dispersed within an ionomer binder; (b) providing a second electrode with or without the ionomer binder; (c) providing an electrolyte; and (d) configuring the first electrode, second electrode, and electrolyte such that the electrodes are spaced apart from one another yet in electrical communication through the electrolyte.

BRIEF DESCRIPTION OF THE DRAWINGS

The invention will now be described with reference to the drawings wherein.

DETAILED DESCRIPTION OF THE INVENTION

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Figure 1:
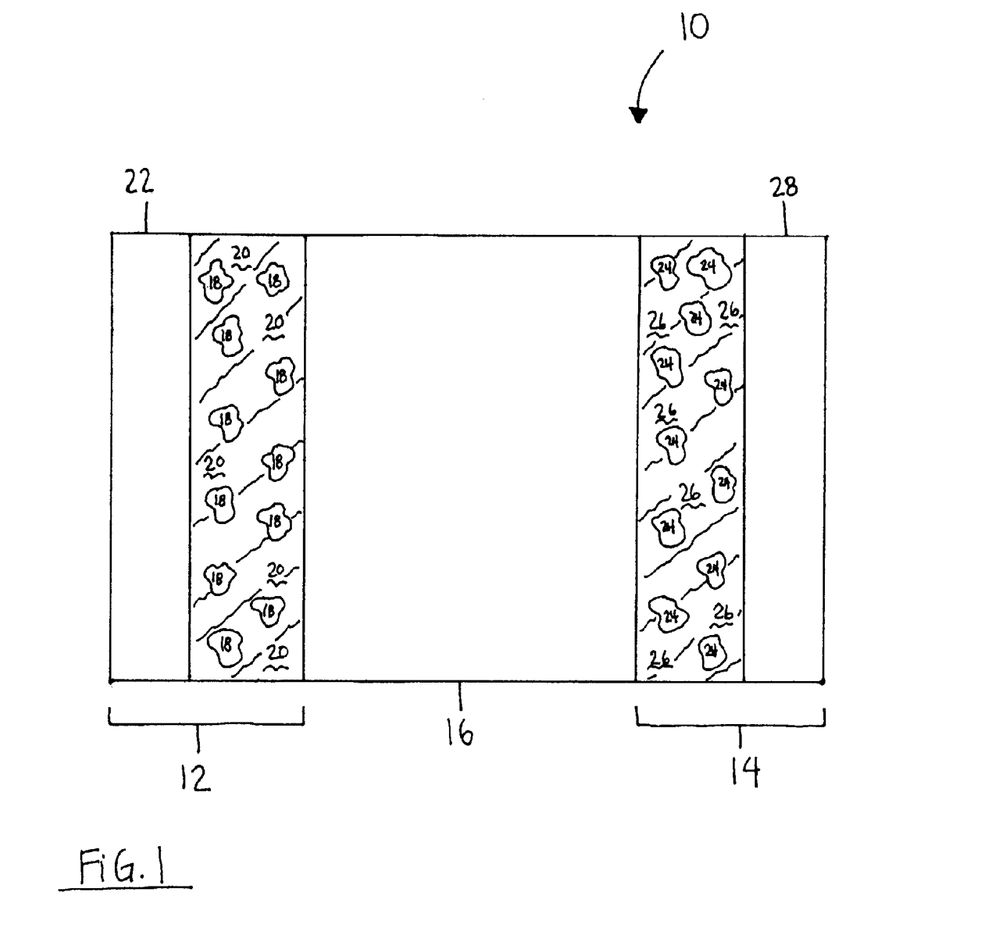
FIG. 1 of the drawings is a cross-sectional schematic representation of an electrochemical cell fabricated in accordance with the present invention.

Referring now to the drawings and to FIG. 1 in particular, a first embodiment of electrochemical cell 10 is shown, which generally comprises first electrode 12, second electrode 14, and electrolyte 16. It will be understood that FIG. 1 is merely a cross-sectional schematic representation of electrochemical device 10. As such, some of the components have been distorted from their actual scale for pictorial clarity. As will be discussed in greater detail below, at least one of first electrode 12 and second electrode 14 includes an ionomer binder which is sufficiently insoluble in conventional organic electrolytes used in lithium/lithium ion based secondary electrochemical cells to preclude swelling of the same and/or exhibit enhanced adhesion to an associated current collector relative to conventional, non-ionomer binder materials.

First electrode 12 comprises an anode fabricated from anodic active material 18 dispersed within binder 20, which is applied onto current collector 22. For purposes of the present disclosure, anodic active material 18 may be fabricated from, for example, lithium, a carbonaceous source, such as carbon black and/or graphite, or a mixture of lithium and a carbonaceous source. Binder 20 may be fabricated from any one of a number of conventional binder materials known in the art, or, alternatively may comprise an ionomer binder as will be discussed in greater detail hereinbelow. It will be understood that current collector 22 may be fabricated from any one of a number of materials that would be known to those having ordinary skill in the art, including a transition metal foil or mesh, such as copper foil or mesh, etcetera.

Second electrode 14 comprises a cathode fabricated from a cathodic active material 24 dispersed within binder 26, which is applied onto current collector 28. For purposes of the present disclosure, cathodic active material 24 may be fabricated from, among other materials, a transition metal oxide, a lithium transition metal oxide, such as, for example, $LiMn_2O_4$, $LiCoO_2$, or $LiNiO_2$, a doped transition metal oxide, and/or a mixed transition metal oxide, (optionally doped with a carbonaceous material—which serves as a conductivity enhancer) just to name a few. Binder 26 may be fabricated from any one of a number of conventional binder materials known in the art, or, alternatively may comprise an ionomer binder as will be discussed in greater detail hereinbelow. It will be understood that current collector 28 may be fabricated from any one of a number of materials that would be known to those having ordinary skill in the art, including, but not limited to, aluminum foil or mesh.

Electrolyte 16 includes a conventional salt (not shown), such as $LiAsF_6$, $LiPF_6$, $LiCF_3SO_3$, $LiN(CF_3SO_2)_3$, $LiBF_4$, or $LiClO_4$ at least partially dissolved in a conventional solvent (not shown), such as propylene carbonate (PC), ethylene carbonate (EC), diethyl carbonate (DEC), dimethyl carbonate (DMC), and mixtures thereof. Although, other commercially available and conventionally used solvents and salts or electrolyte systems, including liquid, gel, hybrid, and/or solid state electrolyte systems are likewise contemplated for use in accordance with the present invention.

For purposes of the present disclosure, one or both of binders 20 and 26 may comprise an ionomer binder. The ionomer binder provides at least three benefits relative to conventional, non-ionomer binders. First, the ionomer binder carries a charge, which enhances adhesion between the binder material and an associated current collector, such as current collectors 22 and/or 28. Second, the charge of the ionomer binder facilitates enhanced adhesion between the electrode active material and the ionomer binder itself. Third, the ionomer binder exhibits sufficient insolubility characteristics so as to preclude swelling of the binder material, which, in turn, facilitates long term mechanical and electrical contact among the electrode active material itself, as well as between the electrode active material and an associated current collector. This is also true at elevated temperatures inasmuch as electrodes fabricated hereinbelow with the ionomer binder were soaked in a solvent mixture comprising EC:DEC at approximately 50 degrees centigrade for two hours—without any swelling of the binder material being observed. As is provided in the examples hereinbelow, electrochemical cells having such an ionomer binder exhibit remarkable capacity retention over numerous cycles without evidence of any material swelling of the binder material. For purposes of the present disclosure, the ionomer binder may comprise an acidic polymer such as 2-acrylamido-2-methyl-1-propane-sulphonic acid that is neutralized by one or more lithium salts using conventional means, the product of which is herein referred to as LiAMPS. It will be understood that ionomer materials other than LiAMPS are suitable for use in accordance with the present invention so long as the ionomer binder: (1) is sufficiently insoluble in conventional lithium ion secondary cell electrolyte solvents; and (2) exhibits enhanced adhesion with an associated current collector relative to a non-ionomer binder.

The present invention is also directed to a process for fabricating an electrochemical cell comprising the following steps. First, an electrode is provided which includes a current collecting substrate and an electrode active material associated with at least a portion of the current collecting substrate, wherein the electrode active material is at least partially dispersed within an ionomer binder. Next, a second electrode with or without the ionomer binder is provided. Third, an electrolyte is provided. Finally, the first electrode, second electrode, and electrolyte are configured such that the electrodes are spaced apart from one another yet in electrical communication through the electrolyte.

Binder Preparation

It will be understood that in the examples provided hereinbelow, copolymers were prepared by free radical polymerization, and in the cases where the charged monomer was in the hydrogen form, it was neutralized with a stoichiometric amount of $Li_2CO_3$. Any other monomer was subsequently added to the reactor. The solution was purged with oxygen free argon for a period of time, followed by the addition of a polymerization initiator. The polymerization reaction was performed at elevated temperature, and was completed in approximately an hour.

The obtained copolymer was precipitated twice in a non-solvent in order to remove any unreacted monomers and initiator decomposition byproducts. The precipitated polymer was then dried under reduced pressure for several hours at approximately 60–80 degrees centigrade.

Electrode Preparation

Composite electrodes were prepared by conventional solvent casting. The appropriate amount of electrode active materials and carbon black were mixed. The copolymer was dissolved in an appropriate solvent (2–3% w/w), and the obtained solution was added to the powders in order to obtain a slurry. An additional amount of the solvent was added if it was necessary to adjust the slurry viscosity. The slurry was then homogenized using a rotor-stator. Finally, the slurry was coated onto a current collector and dried in an oven using conventional techniques.

Cell Assembly

All electrochemical testing composite electrodes were obtained in accordance with the following examples, and all tests were performed in industrial standard 2032 button cells.

EXAMPLE NO. 1

A copolymer comprising 5 mol % of LiAMPS and 95 mol % of N,N-dimethylacrylamide (DMAA) was synthesized as described above. The copolymer was dissolved in dimethylacetamide (DMA) to make 3% w/w solution. The cathode slurry was prepared by mixing $LiMn_2O_4$ as the active material, carbon black, and the copolymer. The mass ratio of active material:carbon black:copolymer was 82:12:6. An additional 2 grams (g) of DMA was added to adjust the slurry viscosity. The slurry was coated on an Al current collector using a doctor blade.

Figure 2:
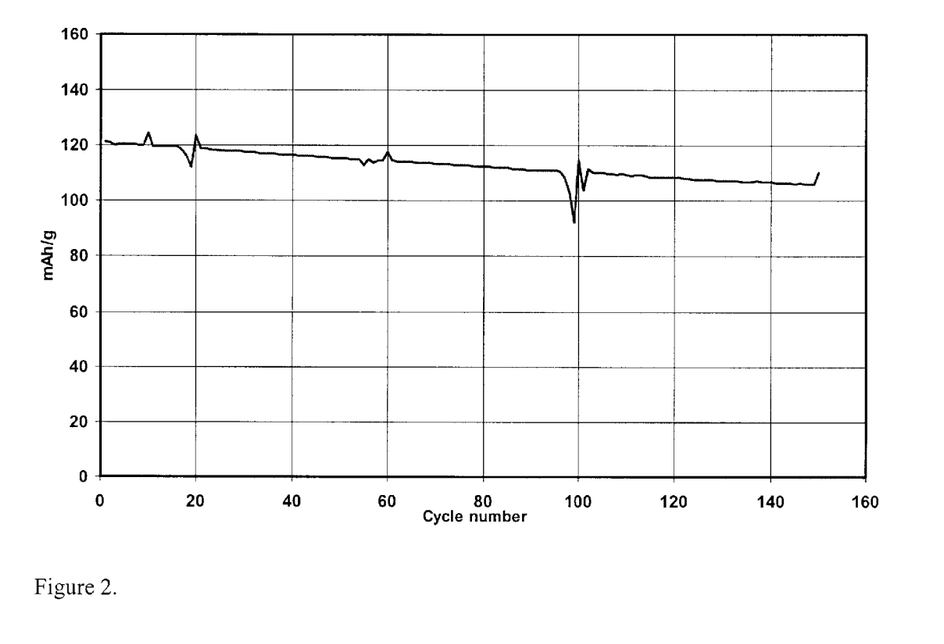
FIG. 2 of the drawings is a two-dimensional plot showing the change in mAh/g as a function of cycle number for Experiment 1.

The obtained positive electrode was tested in a button cell using lithium metal as negative electrode, a glass fiber separator and 60 μl of the electrolyte consisting of 1 mol/l of $LiPF_6$ in EC/DMC (1:1 w/w). The cell was galvanostatically cycled between 4.3 and 3.2 V at ambient temperature. Cycles 1–2 were cycled at $i_c=i_d=6$ mA/g, thereafter at $i_c=i_d=24$ mA/g except for special cycles for measuring internal resistance at cycles 10, 20, 60, 100, 150, impedance at cycles 11, 101, and rate performance at cycles 16–19 and 96–99 (0.2 C, 0.5 C, 1 C and 2 C). The test results are shown in FIG. 2.

EXAMPLE NO. 2

The binder preparation, electrode preparation, and electrode testing were undertaken as described in Example 1, except that 10 mol % of AMPS was used instead of 5 mol %.

Figure 3:
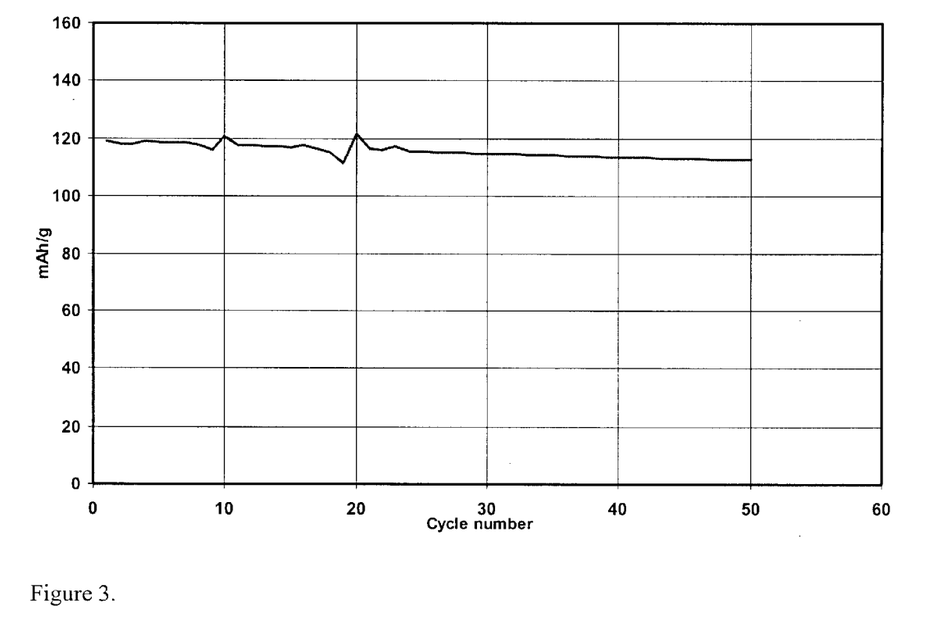
FIG. 3 of the drawings is a two-dimensional plot showing the change in mAh/g as a function of cycle number for Experiment 2.

The button cell was cycled between 4.3 and 3.2 V at ambient temperature. Cycles 1–2 were cycled at $i_c=i_d=6$ mA/g, thereafter at $i_c=i_d=24$ mA/g except for spec cycles for measuring internal resistance at cycles 10 and 20, impedance at cycle 11 and rate performance at cycles 16–19 (0.2 C, 0.5 C, 1 C and 2 C). The test results are shown in FIG. 3.

EXAMPLE NO. 3

The binder preparation, electrode preparation, and electrode testing were undertaken as described in Example 1, except that 15 mol % of AMPS was used instead of 5 mol %. The mass ratio of $LiMn_2O_4$:carbon black:copolymer was 84:12:4.

Figure 4:
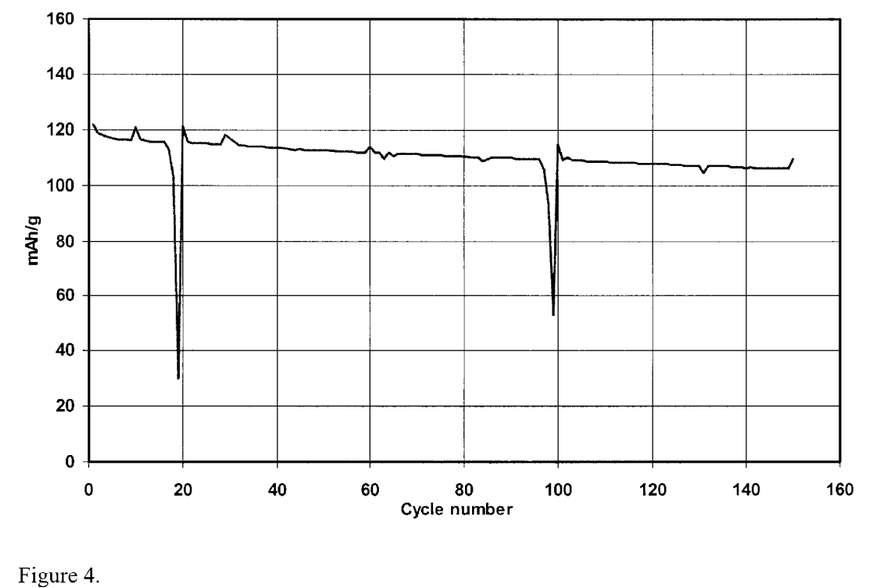
FIG. 4 of the drawings is a two-dimensional plot showing the change in mAh/g as a function of cycle number for Experiment 3.

The button cell was cycled between 4.3 and 3.2 V at ambient temperature. Cycles 1–2 were cycled at $i_c=i_d=6$ mA/g, thereafter at $i_c=i_d=24$ mA/g except for special cycles for measuring internal resistance at cycles 10, 20, 60, 100 and 150 impedance at cycle 11 and 101, and rate performance at cycles 16–19 and 96–99 (0.2 C, 0.5 C, 1 C and 2 C). The test results are shown in FIG. 4.

EXAMPLE NO. 4

The binder preparation, electrode preparation, and electrode testing were undertaken as described in Example 1, except that 10 mol % of AMPS was used instead of 5 mol %. In addition, the polymer binder consisted from a mixture of the DMAA-co-LiAMPS copolymer and poly(vinylidenefluoride) (Kynar 761A) in a mass ratio of 1:4. The electrode composition was $LiMn_2O_4$:carbon black::binder (82:12:6).

Figure 5:
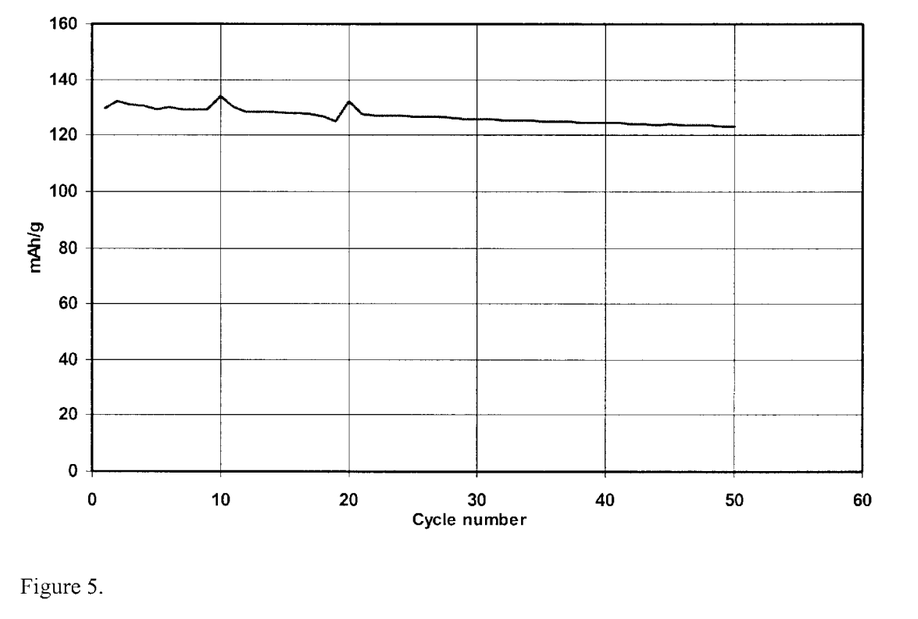
FIG. 5 of the drawings is a two-dimensional plot showing the change in mAh/g as a function of cycle number for Experiment 4.

The button cell was cycled between 4.3 and 3.2 V at ambient temperature. Cycles 1–2 were cycled at $i_c=i_d=6$ mA/g, thereafter at $i_c=i_d=24$ mA/g except for special cycles for measuring internal resistance at cycles 10 and 20, impedance at cycle 11 and rate performance at cycles 16–19 (0.2 C, 0.5 C, 1 C and 2 C). The test results are shown in FIG. 5.

EXAMPLE NO. 5

A copolymer comprising 15 mol % of LiAMPS and 85 mol % of DMAA was synthesized as described above and used as a binder. The copolymer was dissolved in dimethylacetamide (DMA) to make 3% w/w solution.

The anode slurry was prepared by mixing MCMB 2528, as the active material, carbon black with the copolymer solution. The mass ratio of active material:carbon black:copolymer was 89:5:6. An additional 1.5 g of DMA was added to adjust the slurry viscosity. The obtained slurry was coated on Cu current collector using a draw down rod.

Figure 6:
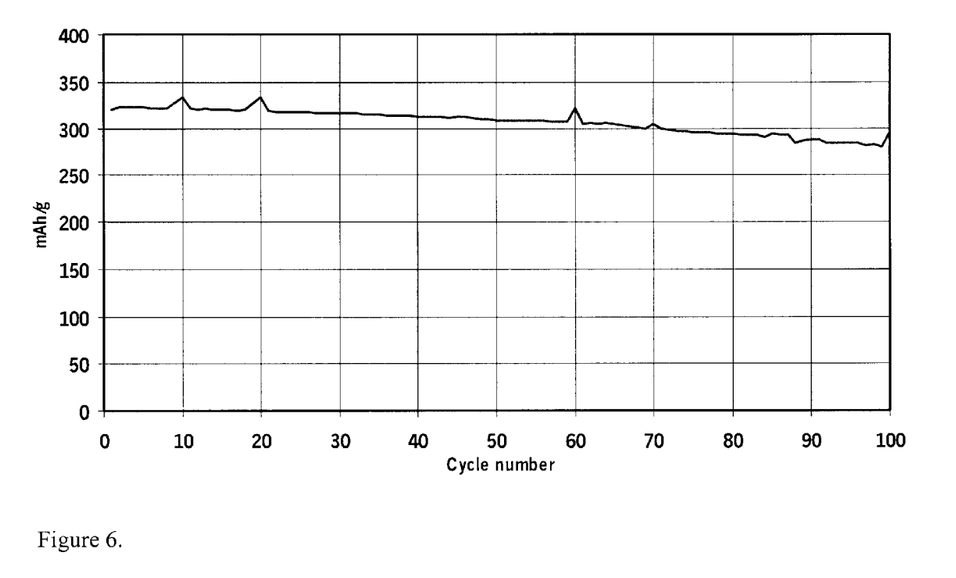
FIG. 6 of the drawings is a two-dimensional plot showing the change in mAh/g as a function of cycle number for Experiment 5.

The electrode was tested in a button cell, using lithium metal as counter electrode. The cell was cycled between 0.02 and 0.5 V at ambient temperature. Cycles 1–5 were cycled at $i_c=i_d=70$ mA/g, thereafter at $i_c=70$ mA/g and $i_d=175$ mA/g, except for special cycles for measuring internal resistance at cycles 10, 20, 60 and 100, impedance at cycle 11 and 101 and rate performance at cycles 16–19 and 96–99 (0.2 C, 0.5 C, 1 C and 2 C). The test results are shown in FIG. 6.

EXAMPLE NO. 6

Copolymer synthesis, electrode preparation, and electrode testing procedures were as described in Example 5, except that 10 mol % of AMPS was used in the copolymer synthesis and polymer binder consisted from a mixture of the DMAA-co-LiAMPS copolymer and poly(vinylidenefluoride) (Kynar 761A) with 10% w/w of the DMAA-co-LiAMPS copolymer. The electrode composition was MCMB 2528:carbon black:binder (87:5:8).

Figure 7:
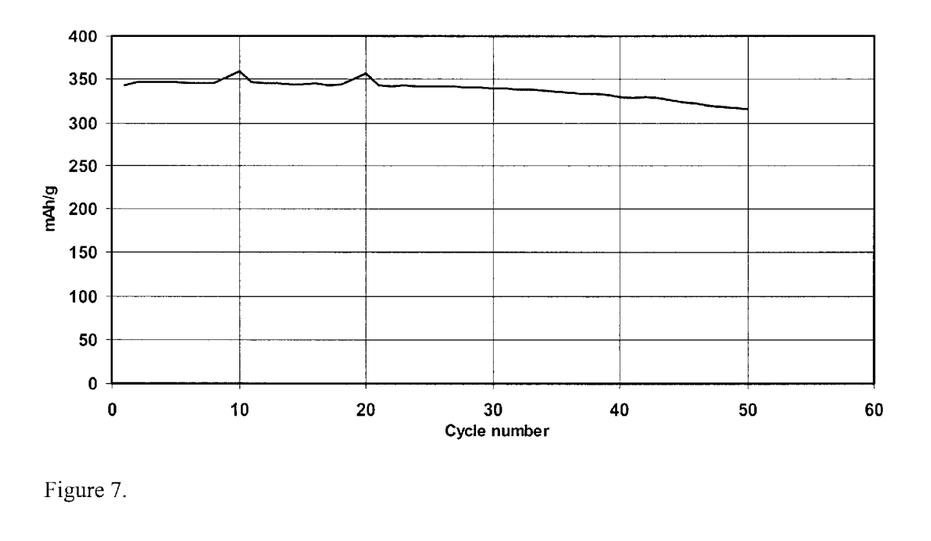
FIG. 7 of the drawings is a two-dimensional plot showing the change in mAh/g as a function of cycle number for Experiment 6.

The electrode was tested in a button cell that was cycled between 0.02 and 0.5 V at ambient temperature. Cycles 1–5 were cycled at $i_c=i_d=70$ mA/g, thereafter at $i_c=70$ mA/g and $i_d=175$ mA/g, except for special cycles for measuring internal resistance at cycles 10 and 20, impedance at cycle 11 and rate performance at cycles 16–19 (0.2 C, 0.5 C, 1 C and 2 C). The test results are shown in FIG. 7.

EXAMPLE NO. 7

The positive electrode was prepared in a way according to Example 1, except that 15 mol % of AMPS was used instead of 5 mol %. The mass ratio of $LiMn_2O_4$:carbon black:binder was 82:12:6. The negative electrode was prepared according to Example 5.

The 2032 button cell was assembled using described positive and negative electrodes, a glass fiber as a separator and 50 ul of 1 mol/l of $LiPF_6$ in EC/DMC (1:1 w/w) as an electrolyte.

Figure 8:
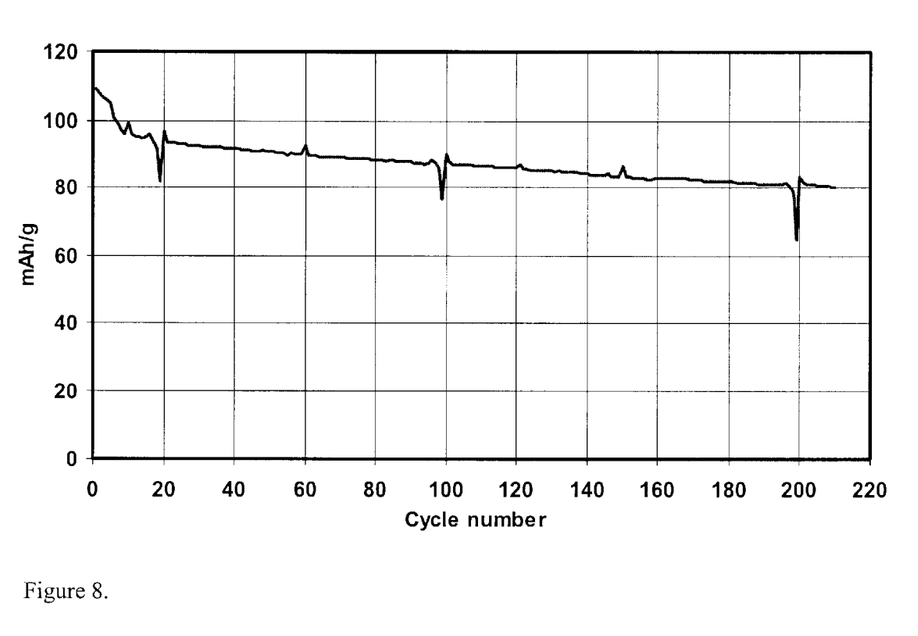
FIG. 8 of the drawings is a two-dimensional plot showing the change in mAh/g as a function of cycle number for Experiment 7.

The cell was cycled between 4.3 and 3.2 V at ambient temperature. Cycles 1–2 were cycled at $i_c=i_d=6$ mA/g, thereafter at $i_c=i_d=24$ mA/g except for special cycles for measuring internal resistance at cycles 10, 20, 60, 100, 150, impedance at cycles 11, 101 and 201, and rate performance at cycles 16–19, 96–99 and 196–199 (0.2 C, 0.5 C, 1 C and 2 C). The test results are shown in FIG. 8.

EXAMPLE NO. 8

The copolymer composed from 10 mol % of LiAMPS and 90 mol % of DMAA was synthesized as described above. The copolymer was dissolved in DMA to make 3% w/w solution. The cathode slurry was prepared by mixing Cr-doped $LiMn_2O_4$ as the active material, carbon black and the copolymer solution on the way that the mass ratio of active material:carbon black:copolymer was 82:12:6. An additional 2.5 g of DMA was added to adjust the slurry viscosity. The slurry was coated on carbon pre-coated Al current collector using doctor blade technique.

The negative electrode was prepared by mixing $Li_4Ti_5O_{12}$, as the active material, carbon black and the DMAA-co-LiAMPS (10 mol % of LiAMPS) copolymer solution on the way that the mass ratio of active material:carbon black:copolymer was 82:12:6. Additional 2.0 g of DMA was added to adjust the slurry viscosity. The slurry was coated on carbon pre-coated Al current collector and solvent was evaporated in an oven.

The 2032 button cell was assembled using prepared positive and negative electrodes, a glass fiber as a separator and 60 ul of 1 mol/l of $LiPF_6$ in EC/DMC (1:1 w/w) as an electrolyte. The cell was crimp-closed.

Figure 9:
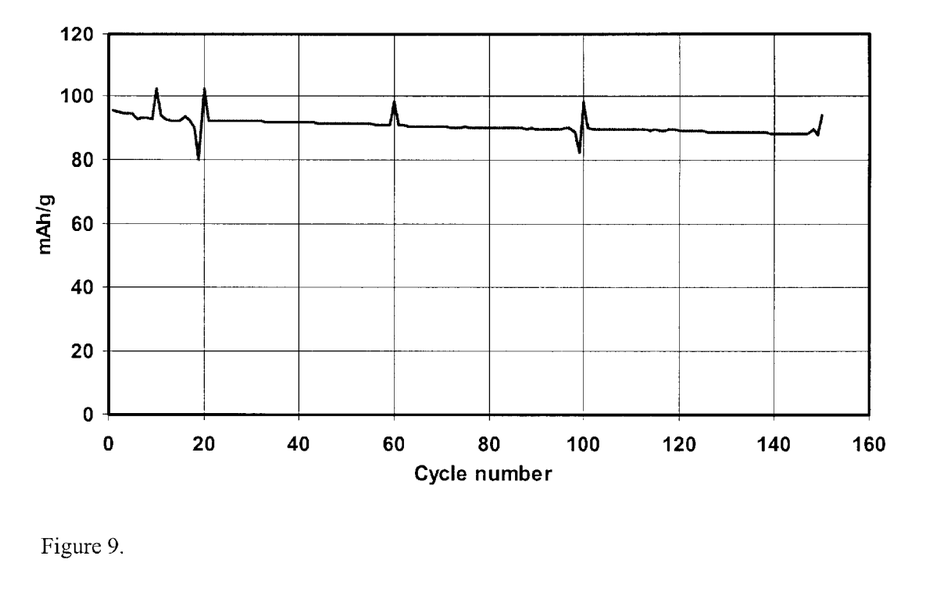
FIG. 9 of the drawings is a two-dimensional plot showing the change in current per mass unit as a function of cycle number for Experiment 8.
Figure 10:
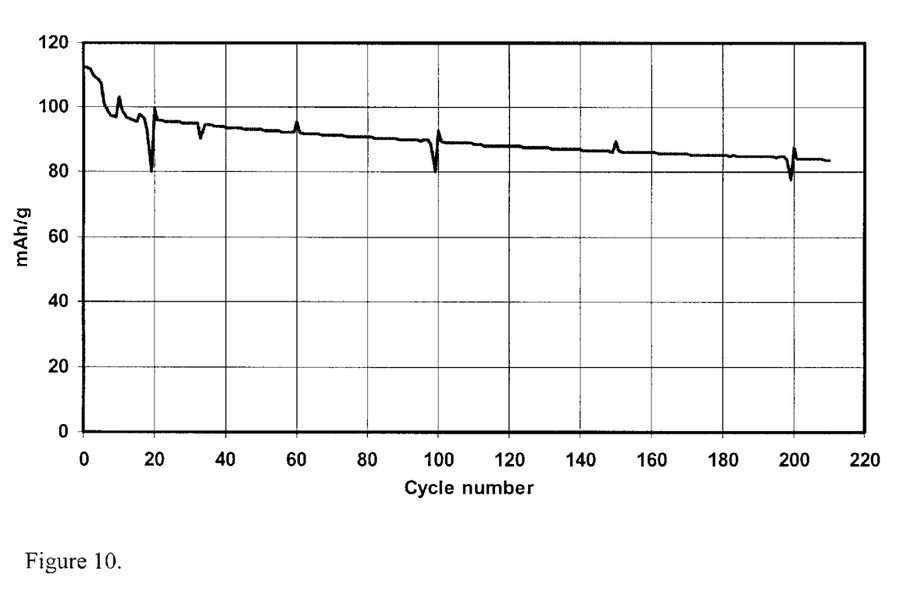
FIG. 10 of the drawings is a two-dimensional plot showing the change in current per mass unit as a function of cycle number for Experiment 9.

The cell was cycled between 2.7 and 1.7 V at ambient temperature. Cycles 1–5 were cycled at $i_c=i_d=75$ mA/g, thereafter at $i_c=75$ mA/g and $i_d=150$ mA/g except for special cycles for measuring internal resistance at cycles 10, 20, 60, 100, 150, impedance at cycles 11 and 101, and rate performance at cycles 16–19 and 96–99 (0.2 C, 0.5 C, 1 C, 2 C and 7 C). The test results are shown in FIG. 9.

EXAMPLE NO. 9

The cell that had positive electrode/separator/negative electrode laminated together was assembled on the following way. The positive electrode was the same as in Example 4. The negative electrode was prepared as in Example 6 except that polymer binder consisted from a mixture of the DMAA-co-LiAMPS copolymer and poly(vinylidenefluoride) (Kynar 761A) with 20% w/w of the DMAA-co-LiAMPS copolymer. The polymer coating, composed of 0.3% w/w of DMAA-co-LiAMPS copolymer with 15 mol % of LiAMPS and 1% w/w of PVdF-co-HFP (Kynar 2801) dissolved in NMP, was applied to a surface modified polypropylene membrane with ~ 45% porosity (Celgard 3501). The separator was dried of the solvent, and the anode, separator, and cathode were laminated together by heat lamination. The assembly was put in a button cell to which 50 ul of 1 mol/l of $LiPF_6$ in EC/DMC (1:1 w/w) was added.

The cell was tested by cycling between 4.3 and 3.2 V at ambient temperature. Cycles 1–2 were cycled at $i_c=i_d=6$ mA/g, thereafter at $i_c=i_d=24$ mA/g except for special cycles for measuring internal resistance at cycles 10, 20, 60, 100, 150 and 200, impedance at cycle 11, 101 and 201, and rate performance at cycles 16–19, 96–99, 196–199 (0.2 C, 0.5 C,1 C and 2 C). The test results are shown in FIG. 9.

As can be seen, the electrochemical cells, as prepared above, exhibited remarkable capacity retention over numerous cycles. Additionally, binder material swelling was not observed.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. An electrode for use in an electrochemical cell, comprising:
   a current collecting substrate; and
   an electrode active material associated with at least a portion of the current collecting substrate, wherein the electrode active material is at least partially dispersed within an ionomer binder, wherein the ionomer binder comprises LiAMPS.

2. The electrode according to claim 1, wherein the ionomer binder is substantially insoluble in polar aprotic organic solvents.

3. The electrode according to claim 1, wherein the ionomer binder is substantially insoluble in a solvent selected from the group consisting of propylene carbonate, ethylene carbonate, diethyl carbonate, dimethyl carbonate, and mixtures thereof.

4. The electrode according to claim 1, wherein the ionomer binder exhibits enhanced adhesion with an associated current collector relative to a non-ionomer binder and to the electrode active material.

5. An electrode for use in an electrochemical cell, comprising:
   a current collecting substrate; and
   an electrode active material associated with at least a portion of the current collecting substrate, wherein the electrode active material is at least partially dispersed within an ionomer binder, wherein the ionomer binder comprises a combination of LiAMPS and DMAA.

6. An electrode for use in an electrochemical cell, comprising:
   a current collecting substrate; and
   an electrode active material associated with at least a portion of the current collecting substrate, wherein the electrode active material is at least partially dispersed within an ionomer binder, wherein the ionomer binder comprises a combination of DMAA-co-LiAMPS copolymer and PVDF.

7. The electrode according to claim 1, wherein the electrode active material comprises a conductivity enhancing material.

8. The electrode according to claim 1, wherein the electrode active material comprise a transition metal oxide and/or a doped transition metal oxide and or a mixture of transition metal oxides.

9. An electrochemical cell, comprising:
an electrolyte; and
a first electrode and a second electrode, wherein at least one of the first and second electrodes comprises:
a current collecting substrate; and
an electrode active material associated with at least a portion of the current collecting substrate, wherein the electrode active material is at least partially dispersed within an ionomer binder, wherein the ionomer binder comprises LiAMPS.

10. The electrochemical cell according to claim 9, wherein the ionomer binder is substantially insoluble in polar aprotic organic solvents.

11. The electrochemical cell according to claim 9, wherein the ionomer binder is substantially insoluble in a solvent selected from the group consisting of propylene carbonate, ethylene carbonate, diethyl carbonate, dimethyl carbonate, and mixtures thereof.

12. The electrochemical cell according to claim 9, wherein the ionomer binder exhibits enhanced adhesion with an associated current collector relative to a non-ionomer binder.

13. An electrochemical cell, comprising:
an electrolyte; and
a first electrode and a second electrode, wherein at least one of the first and second electrodes comprises:
a current collecting substrate; and
an electrode active material associated with at least a portion of the current collecting substrate, wherein the electrode active material is at least partially dispersed within an ionomer binder, wherein the ionomer binder comprises a combination of LiAMPS and DMAA.

14. An electrochemical cell, comprising:
an electrolyte; and
a first electrode and a second electrode, wherein at least one of the first and second electrodes comprises:
a current collecting substrate; and
an electrode active material associated with at least a portion of the current collecting substrate, wherein the electrode active material is at least partially dispersed within an ionomer binder, wherein the ionomer binder comprises a combination of DMAA-co-LiAMPS copolymer and PVDF.

15. The electrochemical cell according to claim 9, wherein the electrode active material comprises a carbonaceous material.

16. The electrochemical cell according to claim 9, wherein the electrode active material comprise a transition metal oxide and/or a doped transition metal oxide and/or a mixture of transition metal oxides.

17. An electrochemical cell, comprising:
an electrolyte; and
a first electrode and a second electrode wherein at least one of the first and second electrodes comprises:
a current collecting substrate; and
an electrode active material associated with at least a portion of the current collecting substrate, wherein the electrode active material is at least partially dispersed within an ionomer binder comprising LiAMPS.

18. An electrochemical cell, consisting of:
an electrolyte comprising a salt at least partially dissolved in a solvent selected from the group consisting of propylene carbonate, ethylene carbonate, diethyl carbonate, dimethyl carbonate, and mixtures thereof; and
a first electrode and a second electrode, wherein at least one of the first and second electrodes comprises:
a current collecting substrate; and
an electrode active material comprising a lithium transition metal oxide,
wherein the electrode active material is associated with at least a portion of the current collecting substrate, and wherein the electrode active material is at least partially dispersed within an ionomer binder comprising LiAMPS.

19. An electrochemical cell, consisting of:
an electrolyte comprising a salt at least partially dissolved in a solvent selected from the group consisting of propylene carbonate, ethylene carbonate, diethyl carbonate, dimethyl carbonate, and mixtures thereof; and
a first electrode and a second electrode, wherein at least one of the first and second electrodes comprises:
a current collecting substrate; and
an electrode active material comprising a carbonaceous material,
wherein the electrode active material is associated with at least a portion of the current collecting substrate, and wherein the electrode active material is at least partially dispersed within an ionomer binder comprising LiAMPS.

20. The electrode according to claim 5, wherein the ionomer binder is substantially insoluble in polar aprotic organic solvents.

21. The electrode according to claim 6, wherein the ionomer binder is substantially insoluble in polar aprotic organic solvents.

22. The electrode according to claim 5, wherein the ionomer binder is substantially insoluble in a solvent selected from the group consisting of propylene carbonate, ethylene carbonate, diethyl carbonate, dimethyl carbonate, and mixtures thereof.

23. The electrode according to claim 6, wherein the ionomer binder is substantially insoluble in a solvent selected from the group consisting of propylene carbonate, ethylene carbonate, diethyl carbonate, dimethyl carbonate, and mixtures thereof.

24. The electrode according to claim 5, wherein the ionomer binder exhibits enhanced adhesion with an associated current collector relative to a non-ionomer binder and to the electrode active material.

25. The electrode according to claim 6, wherein the ionomer binder exhibits enhanced adhesion with an associated current collector relative to a non-ionomer binder and to the electrode active material.

26. The electrode according to claim 5, wherein the electrode active material comprises a conductivity enhancing material.

27. The electrode according to claim 6, wherein the electrode active material comprises a conductivity enhancing material.

28. The electrode according to claim 5, wherein the electrode active material comprise a transition metal oxide and/or a doped transition metal oxide and or a mixture of transition metal oxides.

29. The electrode according to claim 6, wherein the electrode active material comprise a transition metal oxide and/or a doped transition metal oxide and or a mixture of transition metal oxides.

30. The electrochemical cell according to claim 13, wherein the ionomer binder is substantially insoluble in polar aprotic organic solvents.

31. The electrochemical cell according to claim 14, wherein the ionomer binder is substantially insoluble in polar aprotic organic solvents.

32. The electrochemical cell according to claim 13, wherein the ionomer binder is substantially insoluble in a solvent selected from the group consisting of propylene carbonate, ethylene carbonate, diethyl carbonate, dimethyl carbonate, and mixtures thereof.

33. The electrochemical cell according to claim 14, wherein the ionomer binder is substantially insoluble in a solvent selected from the group consisting of propylene carbonate, ethylene carbonate, diethyl carbonate, dimethyl carbonate, and mixtures thereof.

34. The electrochemical cell according to claim 13, wherein the ionomer binder exhibits enhanced adhesion with an associated current collector relative to a non-ionomer binder.

35. The electrochemical cell according to claim 14, wherein the ionomer binder exhibits enhanced adhesion with an associated current collector relative to a non-ionomer binder.

36. The electrochemical cell according to claim 13, wherein the electrode active material comprises a carbonaceous material.

37. The electrochemical cell according to claim 14, wherein the electrode active material comprises a carbonaceous material.

38. The electrochemical cell according to claim 13, wherein the electrode active material comprise a transition metal oxide and/or a doped transition metal oxide and/or a mixture of transition metal oxides.

39. The electrochemical cell according to claim 14, wherein the electrode active material comprise a transition metal oxide and/or a doped transition metal oxide and/or a mixture of transition metal oxides.

* * * * *